Feb. 13, 1934.  E. SKILLMAN  1,946,594
HYDRAULIC BRAKE
Filed Jan. 9, 1931  2 Sheets-Sheet 1
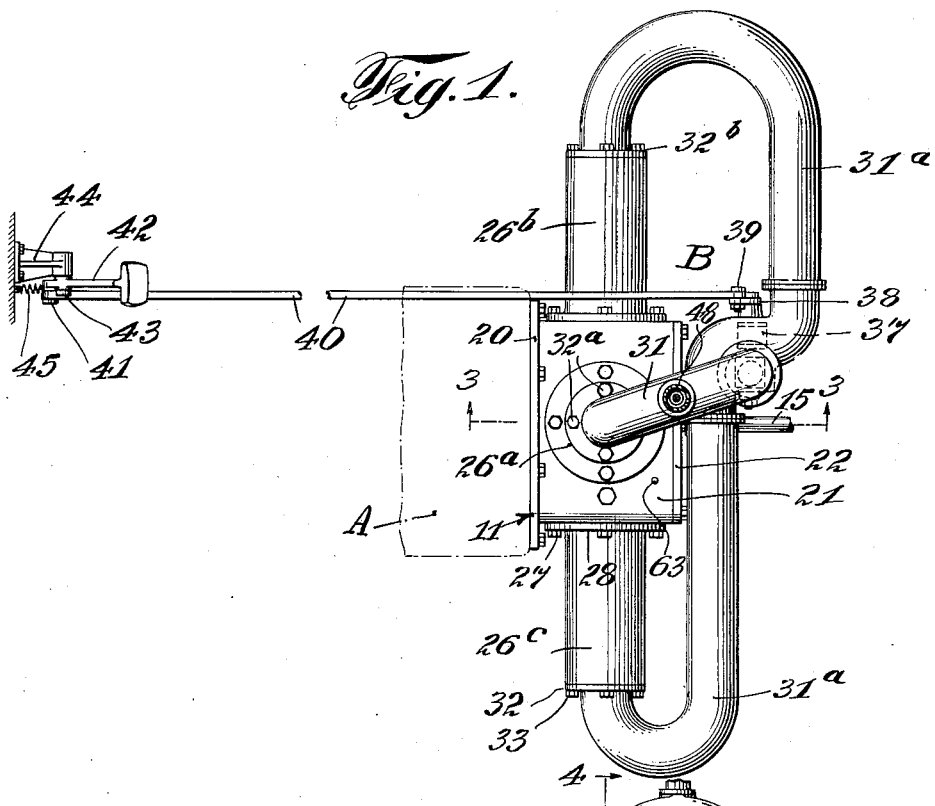
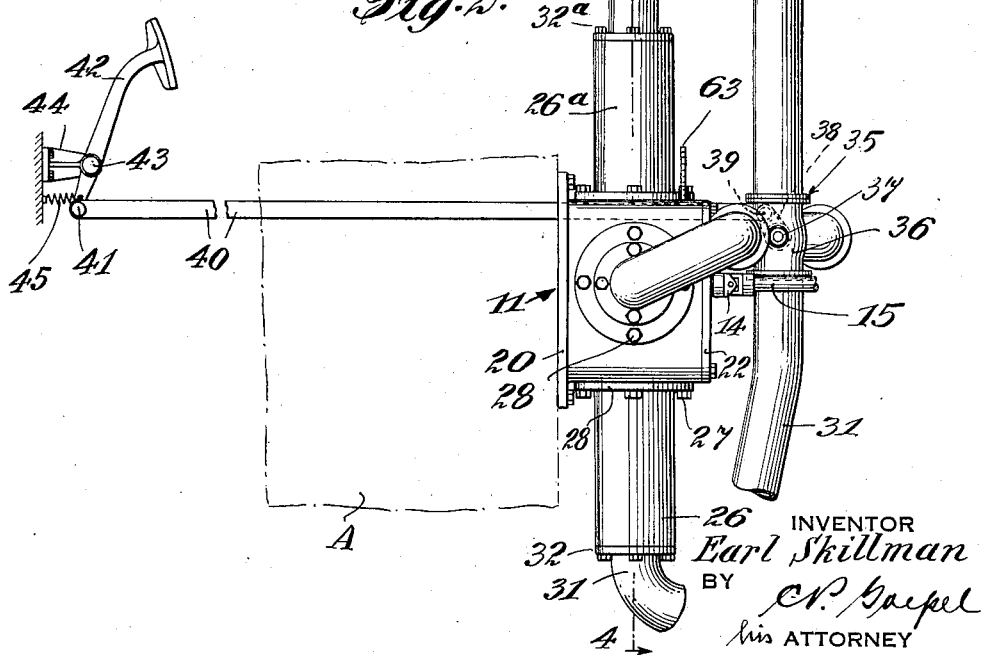
INVENTOR
Earl Skillman
BY
C. N. Goepel
his ATTORNEY Feb. 13, 1934.  E. SKILLMAN  1,946,594
HYDRAULIC BRAKE
Filed Jan. 9, 1931  2 Sheets-Sheet 2
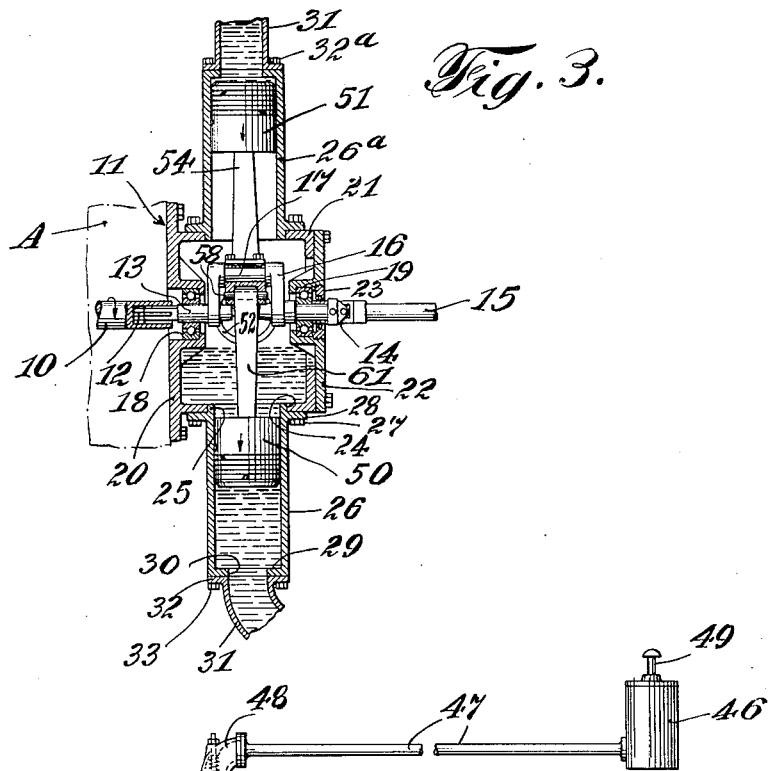
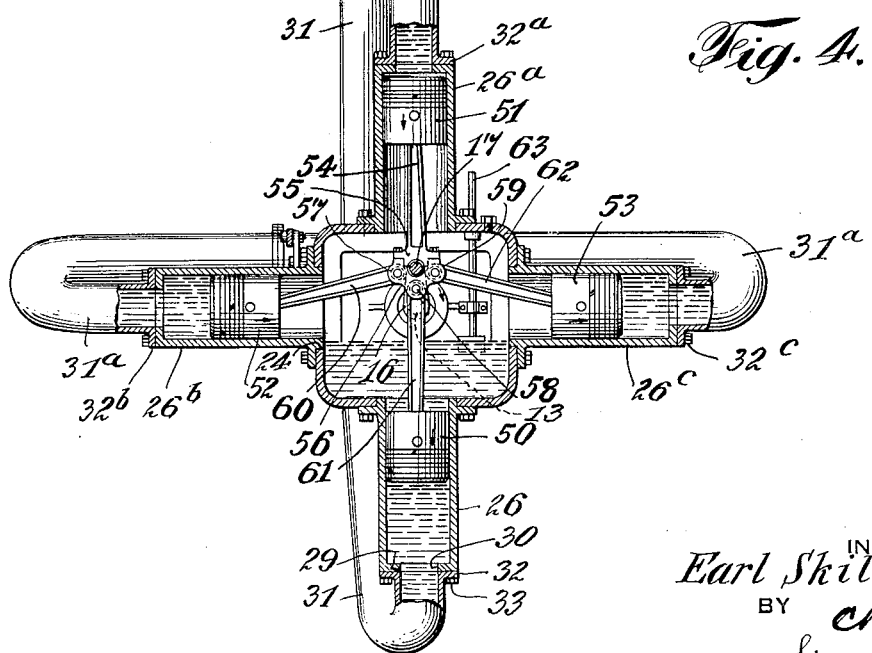
INVENTOR
*Earl Skillman*
BY
*his* ATTORNEY Patented Feb. 13, 1934

1,946,594

UNITED STATES PATENT OFFICE 1,946,594

HYDRAULIC BRAKE

Earl C. Skillman, North Branch, N. J.

Application January 9, 1931. Serial No. 507,588

2 Claims. (Cl. 188—91)

This invention relates to the art of brakes, and is more particularly concerned with a novel type of hydraulic brake designed primarily for use in connection with motor vehicles.

The invention has in view as an important object, the provision of instrumentalities which are adapted to be associated with the main propeller shaft of a motor vehicle and which include cylinder and piston devices which constitute a part of a hydraulic system which is affected by rotation of the propeller shaft. More particularly, I propose to provide a braking system which includes a plurality of pairs of the cylinder and piston devices, the devices of each pair being opposed to one another and which are connected by a conduit which contains some suitable hydraulic medium such as oil. A control valve is included in the conduit and serves to permit or prevent movement of the hydraulic medium in the conduit under the influence of the pistons. With the valve open, the propeller shaft is permitted to rotate while a closing of the valve prevents such rotation in providing the braking effects.

A more particular feature of the invention is associated with the disposition of the pistons. It is my idea to avail of four pistons which are spaced 90° apart and each of which is drivably connected by a connecting rod with a crank arm formed on the propeller shaft. With this arrangement, smooth and even braking effects are provided due to movements of the crank arm in all angular positions being properly resisted by the piston devices.

A more detailed feature of the invention lies in the particular manner of connecting the connecting rods with the crank arm. I propose to have one of the connecting rods mounted directly on the crank arm, while the other three connecting rods are connected to the first mentioned connecting rod.

Inasmuch as the invention contemplates the use of four piston devices, each of which is opposed to another, the conduits connecting the opposed devices must cross one another, and this invention comprehends an arrangement wherein a single valve device is availed of in connection with both of the conduits and which valve is controlled from the driver's seat of the vehicle. The operation of the valve causes opening or restriction of both of the conduits simultaneously, as will be pointed out in detail hereinafter.

With these and other more detailed objects and advantages in view, as will in part become apparent and in part be hereinafter stated, the invention comprises certain novel constructions, combinations and arrangements of parts as will be subsequently specified and claimed.

For a full and more complete understanding of the invention, reference may be had to the following description and accompanying drawings wherein—

Figure 1 is a plan view partly in elevation and partly diagrammatic of a hydraulic brake made in accordance with the present invention and illustrated as applied to the transmission casing of a motor vehicle;

Fig. 2 is a side view, showing the construction brought out in Fig. 1;

Fig. 3 is a detail section taken through the braking mechanism about on the plane represented by the line 3—3 of Fig. 1, and Fig. 4 is a section taken about on the plane indicated by the line 4—4 of Fig. 2.

Referring now to the drawings, a transmission casing of a motor vehicle is indicated in dotted lines in Figs. 1 and 2 and designated A. The novel hydraulic brake hereof is mounted on the rear end of the transmission casing A and referred to generally as B. The brake B is mounted on the casing A through the medium of the bolted flange connection shown at 11.

The drive shaft from the internal combustion engine as it extends through the transmission casing is shown at 10 and is indicated by a spline connection indicated at 12 with a brake shaft section designated at 13, the latter being connected by universal driving couplings shown at 14 with the main propeller shaft 15 of the vehicle. The brake shaft section 13 is formed with a crank portion 16 including an arm 17 which extends parallel to the shaft section 13. It is notable that this shaft section 13 is mounted in bearing devices indicated at 18 and 19 which are carried by a casing now to be described.

The casing of the brake mechanism comprises a wall 20 which is connected with the transmission case A by the connections 11 and from which extend four walls 21, which carry closure means for the interior of the casing in the form of a plate 22, this plate carrying the mounting for the bearing races 19 which are held in position by the retaining plug shown at 23.

Each of the side walls 21 is formed with an opening 24 and connected to each of the side walls with a lip portion 25 projecting into the opening, is a cylinder 26 which is held in assembled position by means of screws 27 passing through a flange 28 with their ends engaging the side walls 21. The cylinder 26 has an end wall 29 formed with an opening 30 and a conduit 31 having a flanged end 32 which is clamped to this end wall 29 by means of screw members shown at 33, the bore of the conduit aligning with the opening 30. This conduit 31 extends around the propeller shaft and has its other end connected to another cylinder 26ᵃ in a similar manner as indicated at 32ᵃ. It is notable that the cylinders 26 and 26ᵃ are disposed on opposite sides of the hydraulic brake casing and intermediate these two cylinders are a similar pair of cylinders 26ᵇ and 26ᶜ which are also opposed to one another. These cylinders 26ᵇ and 26ᶜ are connected by a conduit 31ᵃ which crosses the conduit 31 as shown at 35, a cross coupling 36 being availed of to effect the crossed relation between the conduits 31 and 31ᵃ. Each extremity of the conduit 31ᵃ is connected to the extremity of the respective cylinders 26ᵇ and 26ᶜ by connections 32ᵇ and 32ᶜ. The cross coupling 36 includes a valve device of a well known type which is effective to control the flow of fluid through each of the conduits 31 and 31ᵃ, an operating part of the device being shown at 37, and from which extends an arm 38 that has pivotally connected at its free end as shown at 39, a connecting link 40, the other extremity of which is pivotally connected at 41 to the lower extremity of an operating member 42 which is pivotally mounted at 43 on a bracket 44. A spring 45 is connected to the lower end of this operating lever 42 and serves to normally maintain the connections in position in which the control valve is open.

A hydraulic medium such as oil is received in the conduits 31 and 31ᵃ and the respective cylinders to which they are connected and a reserve supply of this oil may be kept in a reservoir shown at 46 which is connected by a pipe line 47 with a one-way valve connection shown at 48 which permits of the admittance of additional oil to the hydraulic system when needed. The reservoir may include a pump device indicated at 49 which may be operated to supply the additional oil.

Pistons 50, 51, 52 and 53 are mounted in the cylinders 26, 26ᵃ, 26ᵇ and 26ᶜ respectively, and are slidably movable in these cylinders with the well known piston action, the outward movement of the pistons being towards the end walls 29 of the cylinders. The piston 51 is connected by a connecting rod 54 directly with the crank arm 17 by the connections shown at 55 which includes a member 56 that is formed with pairs of spaced ears 57, 58 and 59. A connecting rod 60 extends from the ears 57 to the piston 52 being pivotally connected to the parts at each end, as is a connecting rod 61 which connects the ears 58 with the piston 50. Likewise, a connecting rod 62 connects the ears 59 with the piston 53.

The interior of the brake casing may contain oil for lubricating purposes as shown in Figs. 3 and 4, and a level of this oil may be indicated by the gauge device shown at 63.

The operation of my hydraulic brake may be briefly described as follows:

With the brake assembled on the transmission casing as shown, and the control valve open, the propeller shaft is free to rotate, which movement is accompanied by a reciprocation of the pistons in their respective cylinders, which reciprocating movement entails a corresponding reciprocating movement of the hydraulic medium in the conduits 31 and 31ᵃ. When the brake is to be applied to either reduce the speed or stop the vehicle, the operating lever 42 is engaged by the foot of the operator to affect the control valve through the medium of the connections to restrict the openings through which the hydraulic medium flows in its reciprocating movement. If this opening is only partially restricted, the speed of the vehicle is only reduced as a certain amount of reciprocation of the oil is permitted against the resistance of the restricted openings. If it is desired to bring the vehicle to a complete stop, the openings may be completely closed by the control valve whereupon movement of the fluid columns is positively inhibited and the rotation of the propeller shaft is stopped. An important phase of the invention resides in the fact that the hydraulic medium provides certain cushioning effects which are important in a brake mechanism. While the vehicle may be stopped with any desired degree of promptness likelihood of damage is obviated by the cushioning effects noted.

While a preferred specific embodiment of the invention is hereinbefore set forth, it is to be understood that I am not to be limited to the exact constructions illustrated and described because various modifications of these details may be provided in putting the invention into practice within the purview of the appended claims.

Nor do I wish to be limited to the use of the brake on the main propeller shaft of a motor vehicle, since it can be mounted on an internal combustion engine, as well as other mechanical motor power devices, as, elevators, boats, trains, etc.

I claim:

1. In a hydraulic brake for motor vehicles, a transmission casing, a housing secured to said casing, a driven shaft having an actuable crank portion rotatable in said housing, a plurality of cylinders projecting from the walls of the housing and having their axes spaced apart ninety degrees, a piston in each cylinder, operative connections between each piston and said crank portion, each cylinder having a length substantially equal to the stroke of its piston and having in its outer end wall a coaxial opening so disposed as to be beyond the maximum outward movement of the piston, conduits containing a hydraulic medium and connecting the openings of the oppositely disposed cylinders to permit axial flow of the medium through the cylinders and into and out of the cylinders, and valve means for regulating the flow of the medium through said conduits.

2. In a hydraulic brake for motor vehicles, a transmission casing, a housing secured to said casing, a driven shaft having an actuable crank portion rotatable in said housing, a plurality of cylinders projecting from the walls of the housing and having their axes spaced apart ninety degrees, a piston in each cylinder, operative connections between each piston and the crank portion, each cylinder having in its outer end wall a coaxial opening so disposed as to be beyond the maximum outward movement of the piston, conduits containing a hydraulic medium and connecting the openings of the oppositely disposed cylinders to permit axial flow of the medium through the cylinders and into and out of the cylinders, and valve means for regulating the flow of the medium through the conduits.

EARL C. SKILLMAN.